US006122576A

United States Patent [19]

[11] Patent Number: 6,122,576

[45] Date of Patent: Sep. 19, 2000

Ries-Müller

[54] DIAGNOSIS OF ELECTRICAL CONSUMERS IN A MOTOR VEHICLE

[75] Inventor: Klaus Ries-Müller, Bad Rappenau, Germany

[73] Assignee: Robert Bosch GmbH, Stuttgart, Germany

[21] Appl. No.: 09/381,164

[22] PCT Filed: Jan. 10, 1999

[86] PCT No.: PCT/DE99/00105

§ 371 Date: Sep. 16, 1999

§ 102(e) Date: Sep. 16, 1999

[87] PCT Pub. No.: WO99/36794

PCT Pub. Date: Jul. 22, 1999

[30] Foreign Application Priority Data

Jan. 17, 1998 [DE] Germany ........................ 198 01 627

[51] Int. Cl.[7] ........................ G06F 11/32

[52] U.S. Cl. ........................ 701/29; 701/36; 340/438; 702/183; 307/31

[58] Field of Search ........................ 701/29, 36; 340/438; 702/183, 184; 307/31, 39

[56] References Cited

U.S. PATENT DOCUMENTS

| | | | |
|---|---|---|---|
| 4,207,611 | 6/1980 | Gordon . | |
| 4,962,456 | 10/1990 | Abe et al. | 701/99 |
| 4,975,846 | 12/1990 | Abe et al. | 701/32 |
| 4,975,847 | 12/1990 | Abe et al. | 701/32 |
| 4,996,643 | 2/1991 | Sakamoto et al. | 701/32 |
| 5,003,477 | 3/1991 | Abe et al. | 701/33 |
| 5,003,478 | 3/1991 | Kobayashi et al. | 701/32 |
| 5,003,479 | 3/1991 | Kobayashi et al. | 701/33 |
| 5,005,129 | 4/1991 | Abe et al. | 701/31 |
| 5,197,326 | 3/1993 | Palm . | |
| 5,388,045 | 2/1995 | Kamiya et al. | 701/35 |
| 5,448,492 | 9/1995 | Kolomyski et al. . | |
| 5,506,772 | 4/1996 | Kubozono et al. | 701/29 |
| 5,506,773 | 4/1996 | Takaba et al. | 701/29 |
| 5,541,571 | 7/1996 | Ochs et al. | 340/426 |
| 5,550,762 | 8/1996 | Doll | 702/183 |
| 5,590,040 | 12/1996 | Abe et al. | 701/35 |
| 5,739,592 | 4/1998 | Rigsby et al. | 307/9.1 |
| 5,808,372 | 9/1998 | Schwegler et al. | 307/10.3 |
| 5,809,437 | 9/1998 | Breed | 701/29 |
| 5,825,097 | 10/1998 | Saito et al. | 307/10.1 |
| 5,890,080 | 3/1999 | Coverdill et al. | 701/29 |
| 5,950,149 | 9/1999 | Fieramosca et al. | 702/183 |
| 5,987,394 | 11/1999 | Takakura et al. | 702/123 |
| 6,014,598 | 1/2000 | Duyar et al. | 701/29 |

*Primary Examiner*—Olga Hernandez
*Attorney, Agent, or Firm*—Walter Ottesen

[57] ABSTRACT

A check of an electrical consumer in a motor vehicle is presented with the check being made by evaluating the on-board network voltage for changes in the operating state of the consumer which are triggered by the control apparatus in special operating states. The triggering takes place disengaged from the normal function of the consumer during normal operation. Examples of special operating states are the post-operation of the control apparatus after the switchoff of the internal combustion engine as well as a switchoff of the injection and/or of the ignition in an overrun operating phase.

13 Claims, 3 Drawing Sheets

DIAGNOSIS OF ELECTRICAL CONSUMERS IN A MOTOR VEHICLE

FIELD OF THE INVENTION

The invention relates to the diagnosis of electrical consumers by evaluating the battery voltage.

BACKGROUND OF THE INVENTION

In this connection, it is known from U.S. Pat. No. 5,197,326 to evaluate the on-board voltage for diagnosing an rpm transducer. The drop and subsequent increase of the on-board voltage is detected by the control apparatus, that is, the battery voltage when actuating the starter. When the control apparatus detects such a voltage trace, the conclusion is drawn that a start operation has taken place. The output signal of the rpm transducer, which is to be monitored, then has to permit recognition that the crankshaft rotates. If the output signal of the rpm transducer does not change, then a defect of the transducer or a line interruption must be present.

DE 44 22 149 discloses how, for example, the operability of a lamp during normal operation of the vehicle can be checked by evaluating the on-board voltage. Disturbances are superposed on the on-board voltage when switching on and switching off individual consumers in normal operation of the motor vehicle which disturbances are caused by the actuation of other consumers. As an example, the injection and ignition signals are mentioned which regularly occur in a running engine. To ease this situation, DE 44 22 149 provides a modeling of the on-board voltage in the operation and/or a mathematical convolution of the measured on-board voltage with a jump-shaped signal. From this, an independence is intended to be achieved from direct-current voltage components and a reduced sensitivity against high-frequency disturbances such as occur in the operation of the vehicle.

SUMMARY OF THE INVENTION

The object of the invention is providing an on-board voltage evaluation for checking electrical consumers in a motor vehicle whose disturbance sensitivity has been further reduced and whose evaluation is further simplified. In this way, the reliability of the evaluation is overall simplified.

The essence of the invention is that various electrical consumers are driven when the influences of other consumers on the on-board voltage changes can be neglected.

In a first embodiment, individual consumers are driven in the control apparatus post-operation when the engine is switched off and a conclusion as to the operability of the consumer is drawn based on the change of the battery voltage.

Motor vehicles whose engines are controlled with the aid of a control apparatus have electronic assembly groups which must be supplied with voltage not only during operation of the motor vehicle but also after switching off the engine, that is, after opening the ignition switch. Conventionally, it is necessary to maintain this voltage supply only for a specific time span after switching off the engine. This time span is generally characterized as the control apparatus post-operation.

Switching on an electrical consumer during the post-operation of the control apparatus leads to a characteristic change of the on-board voltage which is dependent upon the electrical characteristics of the supply line and the consumer (ohmic, capacitive and/or inductive load) and is evaluated for diagnosis in accordance with the invention. As an alternative to the voltage, other electrical parameters, such as the current change, can also be measured.

Consumers, which can be diagnosed, can conceivably be, for example, valves (such as the exhaust-gas recirculation valve, the tank-venting valve, the injection valves) or other equipment (such as the secondary air pump, blowers, ignition coils, et cetera). These consumers are driven normally by the engine control apparatus. The method can, in principle, be expanded to all consumers such as the electrical heaters (for the catalytic converter, the exhaust-gas probe, et cetera) and the light equipment. It is, however, advantageous that the consumer can be controlled independently. After switching the consumer on and off, the particular battery voltage trace is stored. The measurement signals can now be further processed by different evaluation methods or signal processing algorithms. The objective is to distinguish typical signal traces of equipment in good order from the typical traces of defective equipment.

Carrying out the diagnosis in the post-operation of the control apparatus with the engine switched off affords the advantage that no disturbance in-coupling occurs because of the engine operation and the equipment can be driven undisturbed. In this way, a simple and reliable diagnosis of the electrical consumers of the vehicle results overall.

In a second embodiment, a drive of individual consumers takes place with the engine running and with the generator switched off and with further components switched off.

Advantageously, the drive takes place in the overrun operation with the injection and ignition switched off. The battery voltage trace is then not made incorrect by disturbance in-couplings from the generator or injection output stages and/or ignition output stages.

BRIEF DESCRIPTION OF THE DRAWINGS

The invention will now be explained with reference to the drawings wherein.

DESCRIPTION OF THE PREFERRED EMBODIMENTS OF THE INVENTION

Figure 1:
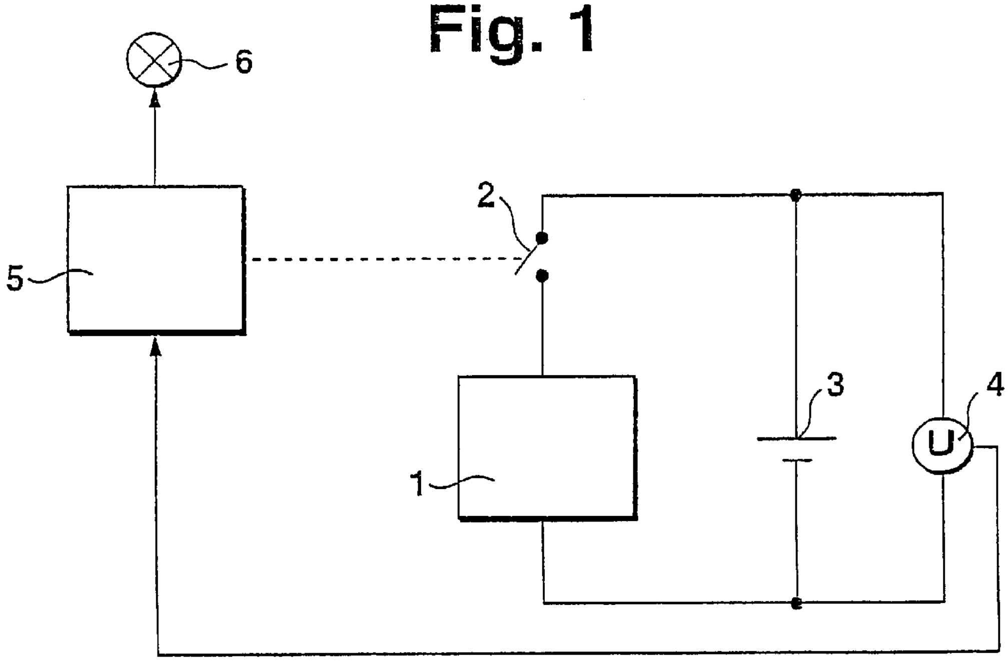
FIG. 1 shows the principle structure of an arrangement suitable for carrying out a first embodiment of the invention.

Reference numeral 1 in FIG. 1 identifies an electrical consumer which is connected to a vehicle battery 3 when the switch 2 is closed. The on-board voltage is present in the current loop of the consumer 1, switch 2 and battery 3. The on-board voltage is detected by the voltmeter 4 and supplied to the control apparatus 5 for evaluation. The control apparatus 5 controls the switch 2. A fault lamp 6 can be activated by the control apparatus 5 in dependence upon the result of the evaluation.

Figure 2:
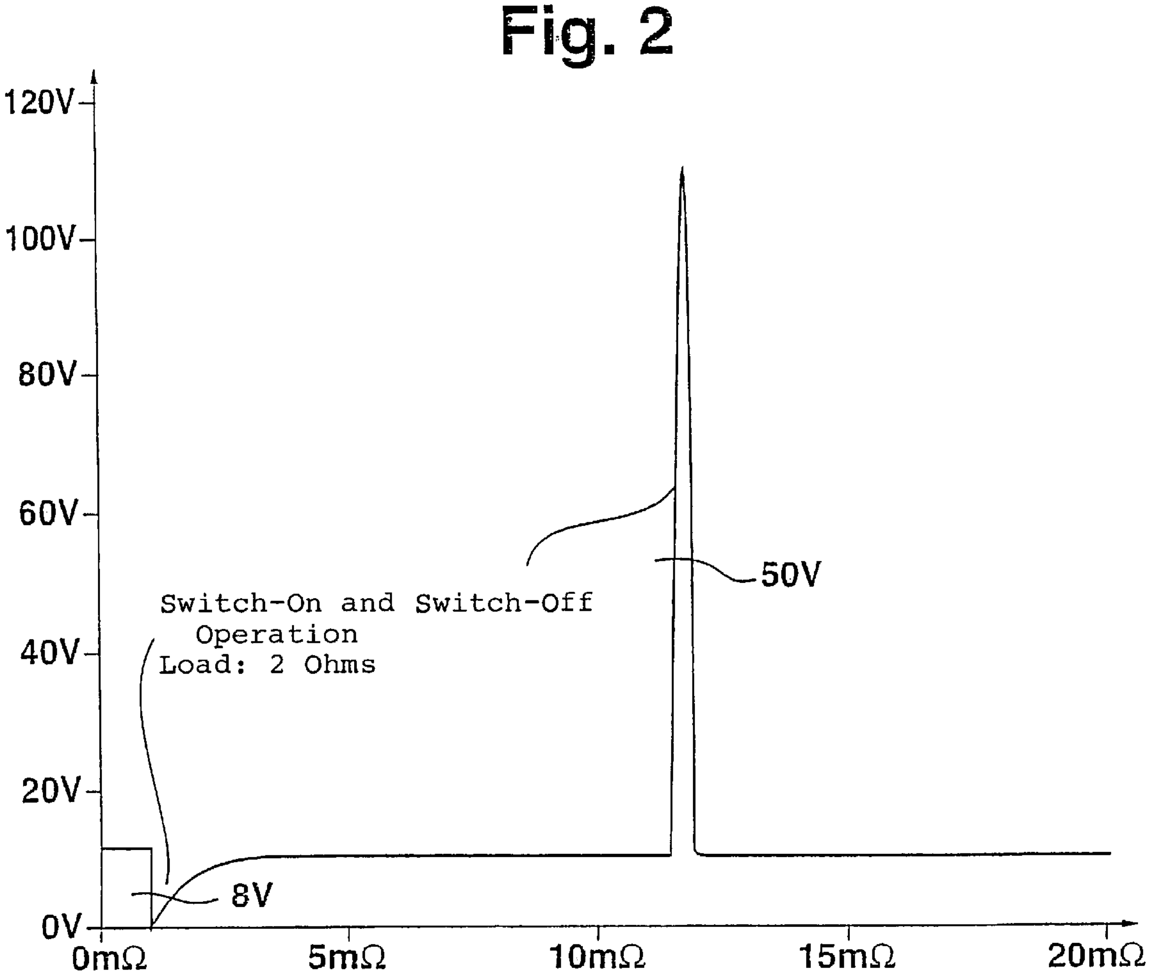
FIG. 2 shows the trace of the voltage as it occurs in the structure of FIG. 1 when the switch 2 is opened and closed.

The switching in of an electrical consumer leads to a typical voltage change in the on-board network as it is shown in FIG. 2. The voltage trace is characterized by the electrical characteristics of the supply line and of the consumer. The voltage trace of FIG. 2 results for an on-board source voltage of 12 Volts, an internal resistance of the voltage source of 20 mΩ, an ohmic supply line resistance of 58 mΩ, an inductive supply line resistance of 50 Ω as well as the switching in of a current intensive ohmic resistor having a 2 Ω resistance to a current-weaker consumer of 24 Ω resistance. The above-mentioned supply line resistances represent long lines in a vehicle on-board network. They correspond to a line having a 5 m length and a 1.5 $mm^2$ cross section.

Figure 3:
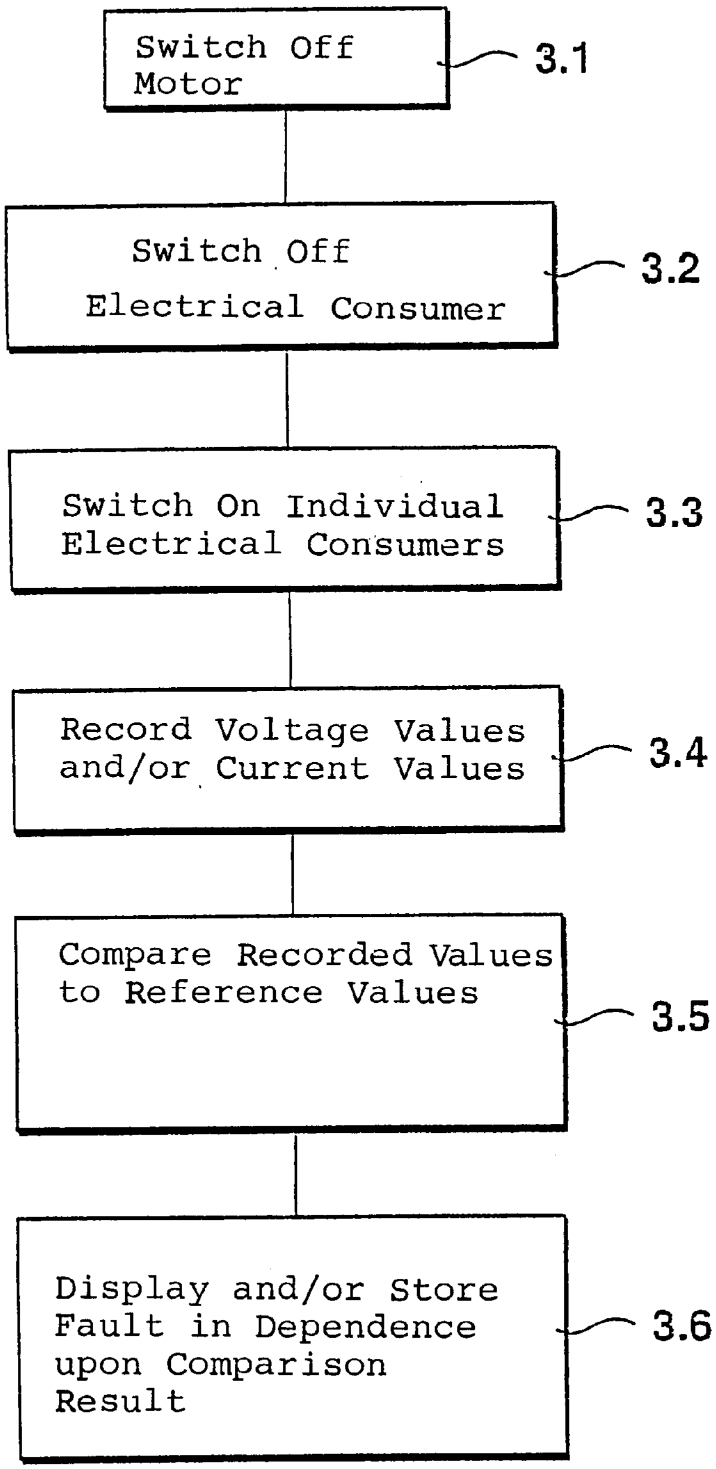
FIG. 3 is a flowchart of the first embodiment of the method according to the invention.

The flowchart of FIG. 3 shows the sequence of the method of the invention.

After switching off the engine in step 3.1, all electrical consumers except for the control apparatus 5 itself are switched off in step 3.2. In the event that functions such as the free burning of the hot wire air mass sensor take place in the post-operation of the control apparatus, the end thereof is awaited. Step 3.3 switches individual consumers on and off for diagnostic purposes with these consumers being separated or disassociated from their function in normal operation. For example, injection valves, ignition coils, exhaust-gas recirculation valves, a tank-venting valve, a secondary air pump, electrical blowers, electrical heaters (for example, for exhaust-gas probes) or even the lighting equipment can be actuated for a short time.

As shown in FIG. 2, the voltage changes are adequately large in order to be detected, for example, with the aid of simple reference or threshold value comparisons. For the example shown, threshold values of approximately 8 volts for switching on and 50 volts for switching off are suitable. If, for example, the reference threshold value of 8 volts is not reached when switching on, then there is a large probability of an electrical defect such as an interruption of the supply line. In step 3.4, a recordation of the voltage values for the switching operations takes place. Here, peak values or even other measured values can, for example, be detected. The measured values reflect the time-dependent trace of the voltage change. Step 3.5 serves to compare the detected values to predetermined reference values. As reference values, simple threshold values are considered for the comparison to the measurement peak values or even stored reference curves. In the case of the curves, an n-dimensional vector can be computed from n measured values recorded sequentially as a function of time. The n-dimensional vector corresponds to an n-dimensional reference vector. The length of the difference vector (that is, the spacing of the two vectors) must for an operable consumer likewise exceed a threshold value.

The display and/or storage of fault data takes place in step 3.6 in dependence upon the threshold comparison in step 3.5. The fault lamp 6 serves to provide the indication. The storage in the control apparatus 5 makes possible a statistical retention of the diagnostic result. Thus, it can be purposeful to switch on the fault lamp only after several occurrences of the same defect and to again switch off the lamp after several non-occurrences of the fault.

Figure 4A:
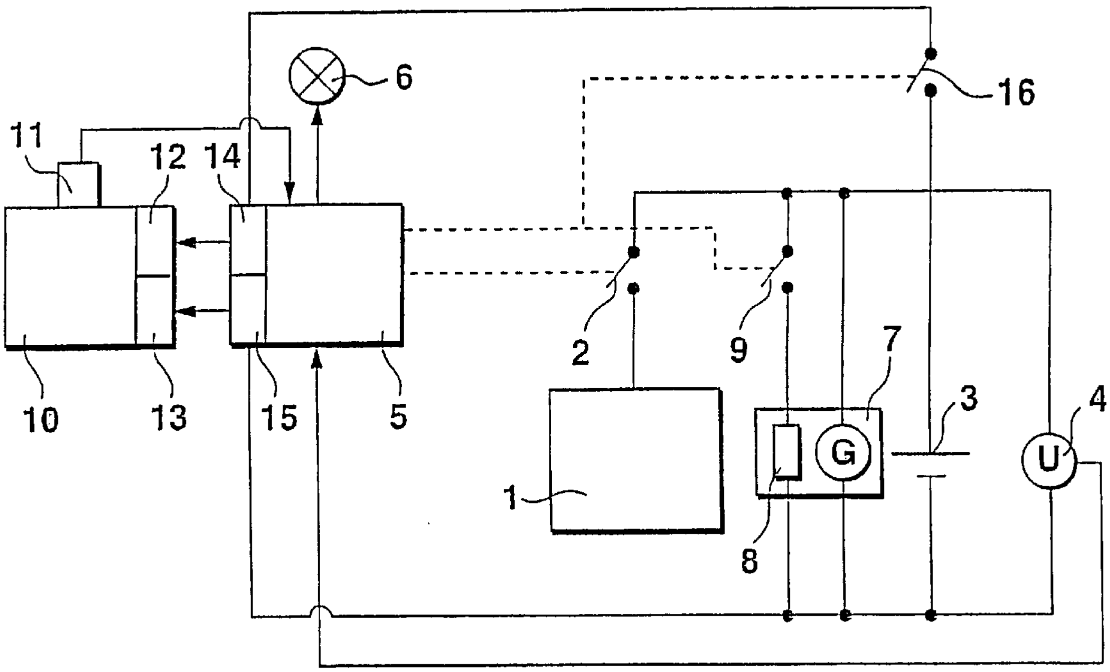
FIG. 4 shows the principal structure of an arrangement suitable for carrying out a second embodiment of the invention; and, FIG. 5 shows a flowchart of the second embodiment of the method of the invention.

The arrangement of FIG. 4*a* concerning the second embodiment of the invention distinguishes from FIG. 1 by showing further components 7 to 16. Reference numeral 7 represents a generator having excitation inductivity 8. The generator can be separated from the on-board network. In FIG. 4*a*, this is made possible by a switch 9 which is actuated by the control apparatus 5. Switch 9 is opened when means 11 for detecting an overrun mode of operation of the internal combustion engine 10 signalizes an overrun operation. Overrun operation is present, for example, when an automobile drives downhill, that is, when the engine is driven by the wheels. Overrun operation can be detected, for example, by a drop below a pregiven lower value for the position of a power actuator of the engine. In addition to switch 9, switch 16 is opened which separates the ignition output stages and/or injection output stages 14 and 15 from the on-board network. This deactivates the ignition devices 12 and the fuel injection devices 13 during overrun operation and prevents disturbance in-couplings from these components into the on-board voltage.

Figure 4B:
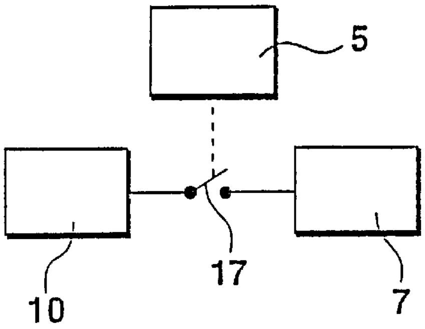

With a mechanical or electrical coupling 17 between generator 7 and the engine 10, FIG. 4*b* shows a further possibility of preventing disturbance in-couplings of the generator to the on-board network voltage. In this embodiment, the mechanical force connection in overrun operation can be interrupted by opening the clutch 17 so that the generator is not driven. The interruption of the force flow then defines an alternative to opening switch 9 in the current supply of the excitation inductivities.

Figure 5:
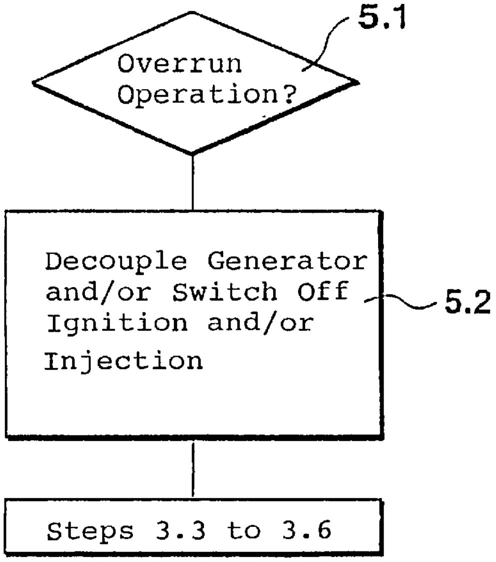

The flowchart of FIG. 5 shows the sequence of an embodiment of the method of the invention with the arrangement of FIG. 4*a*. In step 5.1, a check is made as to whether an overrun operation is present. For a positive result, the generator is switched off in step 5.2 via a mechanical decoupling or opening of the switch 9 in the excitation current loop of the generator as well as the switching off of electrical consumers especially the switching off of injection and ignition output stages.

After step 5.2, the already explained steps 3.3 to 3.6 follow. Stated otherwise, the following takes place: the switching on of individual consumers to be checked, the recordation of voltage values and/or current values, the comparison of the recorded values to reference values as well as the display and/or storage of faults in dependence upon the comparison result.

What is claimed is:

1. An arrangement for checking an electrical consumer in a motor vehicle having an on-board network, the electrical consumer performing an assigned function during normal operation of the motor vehicle, the arrangement comprising:

means for detecting an electrical quantity in said on-board network;

means for separating said electrical consumer from said assigned function and for triggering said electrical consumer in a special operating condition of said motor vehicle while said electrical consumer is separated from said assigned function; and, means for evaluating said electrical quantity as a reaction to said triggering of said electrical consumer.

2. The arrangement of claim 1, wherein said motor vehicle includes an electrical generator.

3. A method of checking an electrical consumer in a motor vehicle having an on-board network and a control apparatus operatively connected to the electrical consumer, the electrical consumer performing an assigned function during normal operation of the motor vehicle, the method comprising the steps of:

separating said electrical consumer from said assigned function;

triggering changes in the operating state of said electrical consumer with said control apparatus during special operating conditions of said motor vehicle;

detecting an electrical quantity of said on-board network; and, evaluating changes of said electrical quantity in response to said triggering.

4. The method of claim 3, wherein said method is applied to additional consumers, which are controllable by the other consumers, which are not actuated by said control apparatus such as the light generator.

5. The method of claim 3, wherein one of said special operating conditions is the post operation of said control apparatus after said motor vehicle is switched off.

6. The method of claim 3, wherein the motor vehicle includes an internal combustion engine and an electric generator driven by said engine; and wherein the method comprises the further step of switching off at least one of the following functions: ignition of said engine, injection of said engine and an electric generator driven by said engine.

7. The method of claim 3, wherein said electrical consumer is normally controlled by said control apparatus during the normal operation of said motor vehicle.

8. The method of claim 7, wherein said method is applied to check a plurality of consumers which include an exhaust-gas return valve, a tank-venting valve, an injection valve or other equipment including a secondary air pump, a blower, ignition coils, electric catalytic converter and exhaust-gas sensor heaters.

9. The method of claim 3, wherein a detected fault is displayed and/or is stored.

10. The method of claim 3, wherein said electrical quantity is a voltage or current which is recorded when switching said electrical consumer on and off; and, said electrical quantity is compared to a predetermined reference value.

11. The method of claim 10, wherein peak values or even several measured values defining a time-dependent trace of the change of said voltage are detected and compared to reference threshold values or reference curves.

12. The method of claim 11, wherein the recorded values are further processed by various evaluation methods or signal processing algorithms.

13. The method of claim 12, wherein an n-dimensional vector is computed from n measured values, which are recorded sequentially as a function of time, the n-dimensional vector corresponding to an n-dimensional reference vector; and, the length of the difference vector is compared to a threshold value.

* * * * *

UNITED STATES PATENT AND TRADEMARK OFFICE

CERTIFICATE OF CORRECTION

PATENT NO. : 6,122,576 
DATED : September 19, 2000
INVENTOR(S) : Klaus Ries-Mueller It is certified that error appears in the above-identified patent and that said Letters Patent is hereby corrected as shown below:

Title page,
Item [22], delete "10" and substitute -- 18 -- therefor.

Signed and Sealed this

Eleventh Day of June, 2002

*Attest:*

JAMES E. ROGAN
*Director of the United States Patent and Trademark Office*

*Attesting Officer*